(12) United States Patent
Thompson et al.

(10) Patent No.: US 11,840,248 B2
(45) Date of Patent: Dec. 12, 2023

(54) METHOD AND SYSTEM FOR CATEGORIZING POWERTRAIN TORQUE REQUESTS

(71) Applicant: Ford Global Technologies, LLC, Dearborn, MI (US)

(72) Inventors: Scott Steadmon Thompson, Belleville, MI (US); Robert Roy Jentz, Westland, MI (US); David Hancock, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 16/562,194

(22) Filed: Sep. 5, 2019

(65) Prior Publication Data

US 2021/0070315 A1    Mar. 11, 2021

(51) Int. Cl.
*B60W 50/10* (2012.01)
*B60W 20/13* (2016.01)
*B60W 40/08* (2012.01)
*G05D 1/02* (2020.01)

(52) U.S. Cl.
CPC .......... *B60W 50/10* (2013.01); *B60W 20/13* (2016.01); *B60W 40/08* (2013.01); *G05D 1/021* (2013.01); *B60W 2040/0818* (2013.01); *B60W 2510/105* (2013.01)

(58) Field of Classification Search
CPC ...... B60W 50/10; B60W 20/13; B60W 40/08; B60W 2040/0818; B60W 2510/105; B60W 30/192; B60W 50/00; B60W 30/18; G05D 1/021; G05D 1/02
See application file for complete search history.

(56) References Cited

U.S. PATENT DOCUMENTS

| | | | |
|---|---|---|---|
| 10,007,263 B1* | 6/2018 | Fields | B60W 30/09 |
| 10,131,362 B1* | 11/2018 | Gingrich | G05D 1/021 |
| 2003/0216847 A1* | 11/2003 | Bellinger | B60W 30/1819 701/51 |
| 2003/0225495 A1 | 12/2003 | Coelingh et al. | |
| 2004/0034460 A1 | 2/2004 | Folkerts et al. | |
| 2009/0084618 A1* | 4/2009 | Thompson | B60K 6/365 701/22 |
| 2009/0118928 A1* | 5/2009 | Heap | B60W 10/115 701/54 |
| 2009/0118938 A1* | 5/2009 | Heap | B60W 10/115 701/54 |
| 2012/0130577 A1* | 5/2012 | Ichimoto | B60W 20/13 903/930 |
| 2014/0121060 A1* | 5/2014 | Gibson | B60W 10/08 477/181 |
| 2018/0105158 A1* | 4/2018 | Namuduri | B60W 30/18127 |
| 2018/0162352 A1* | 6/2018 | Lee | B60W 20/12 |
| 2018/0257632 A1* | 9/2018 | Naserian | B60W 10/08 |

(Continued)

*Primary Examiner* — Aniss Chad
*Assistant Examiner* — Christopher George Fees
(74) *Attorney, Agent, or Firm* — Vincent Mastrogiacomo; McCoy Russell LLP

(57) ABSTRACT

A method for operating a powertrain of an autonomous vehicle is described. In one example, the autonomous driver may supply a torque request and a torque or power urgency assessment to a powertrain controller. The powertrain controller may monitor vehicle control system parameters based on the driver demand torque and the torque or power urgency assessment.

17 Claims, 7 Drawing Sheets

(56) References Cited

U.S. PATENT DOCUMENTS

2019/0197798 A1\* 6/2019 Abari .................... G06Q 10/02
2020/0031332 A1\* 1/2020 Koti ........................ F01N 9/00
2020/0040988 A1\* 2/2020 Duan ................... F16D 48/066

\* cited by examiner

METHOD AND SYSTEM FOR CATEGORIZING POWERTRAIN TORQUE REQUESTS

FIELD

The present description relates to methods and a system for operating a powertrain of a vehicle. The vehicle may include an autonomous driver that requests torque from the powertrain so that the vehicle may reach its intended destination.

BACKGROUND AND SUMMARY

Output of a powertrain of a vehicle may be limited when a human driver requests power from the powertrain so that the possibility of powertrain component degradation may be reduced. For example, if a vehicle is operating in very warm ambient conditions, it may be possible for temperatures of one or more powertrain components to become elevated. A powertrain controller may perform mitigating actions to reduce the temperatures of the one or more powertrain components so that the possibility of the one or more components degrading may be reduced. The mitigating actions may include reducing powertrain output power and/or reducing powertrain efficiency to reduce powertrain component temperature. In addition, it may be desirable for the powertrain controller to take mitigating actions when operating conditions of other powertrain components approach threshold limits. However, there may be vehicle operating conditions where it may be acceptable to continue to operate the powertrain without immediately performing mitigating actions so that some other desirable outcome may be provided via the powertrain.

The inventors herein have recognized the above-mentioned issues and have developed a vehicle operating method, comprising: generating a powertrain torque request and a powertrain torque urgency assessment via an autonomous driver; and adjusting powertrain output torque in response to the powertrain torque request and monitoring one or more control parameters.

By classifying powertrain torque requests according to different urgency levels, it may be possible to provide the technical result of adjusting thresholds at which mitigating actions may be performed and providing higher levels of powertrain output so that desired outcomes may be provided via the powertrain. For example, if it is determined that there is a higher level of urgency to provide requested powertrain output, then one or move powertrain control thresholds may be adjusted such that higher powertrain output levels may be achieved for at least some period of time. Further, powertrain control parameters may be monitored to determine if they exceed the one or more powertrain control thresholds so that it may be determined if the vehicle should return to a service center.

The present description may provide several advantages. Specifically, the approach may provide a desired level of powertrain output that is responsive to urgency of vehicle operating conditions. Further, the approach may provide for returning a vehicle to a service center so that higher levels of powertrain performance may be maintained. In addition, the approach is flexible and it may be applied to a variety of powertrain configurations and control parameters.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
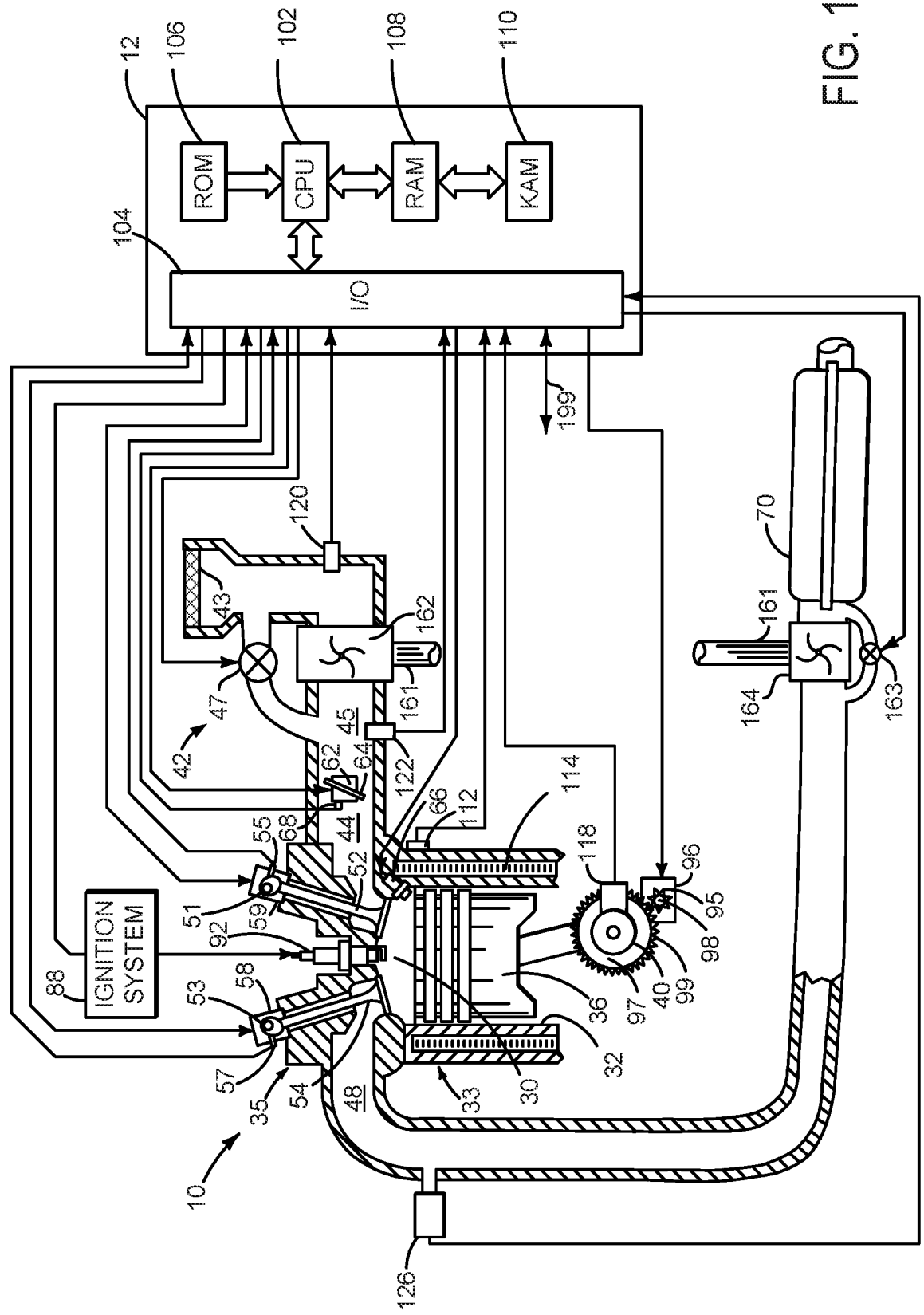
FIG. 1 shows a schematic diagram of an internal combustion engine that may be automatically stopped and started.
Figure 2:
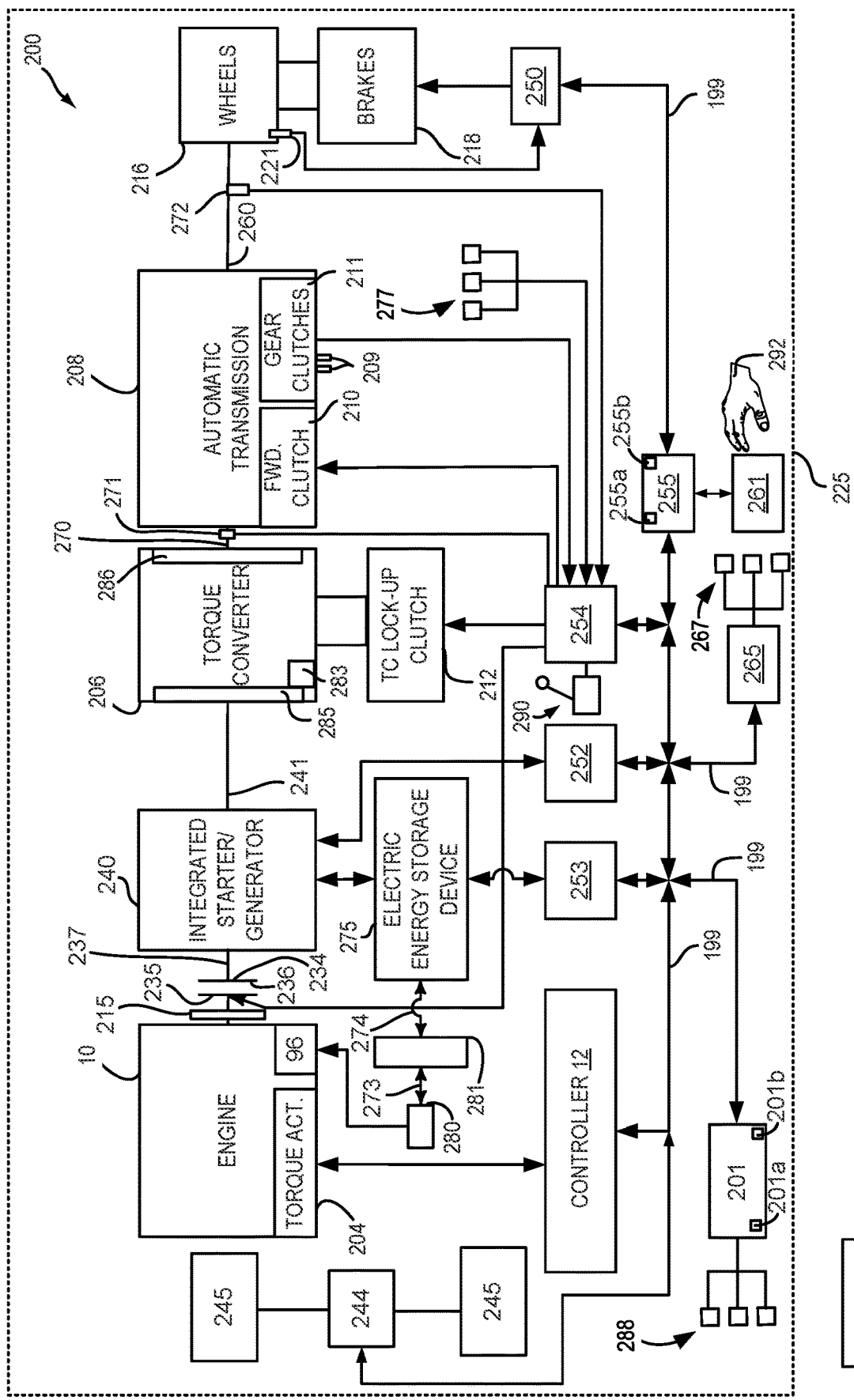
FIG. 2 shows a schematic diagram of a vehicle driveline or powertrain including the internal combustion engine shown in FIG. 1.
Figure 3:
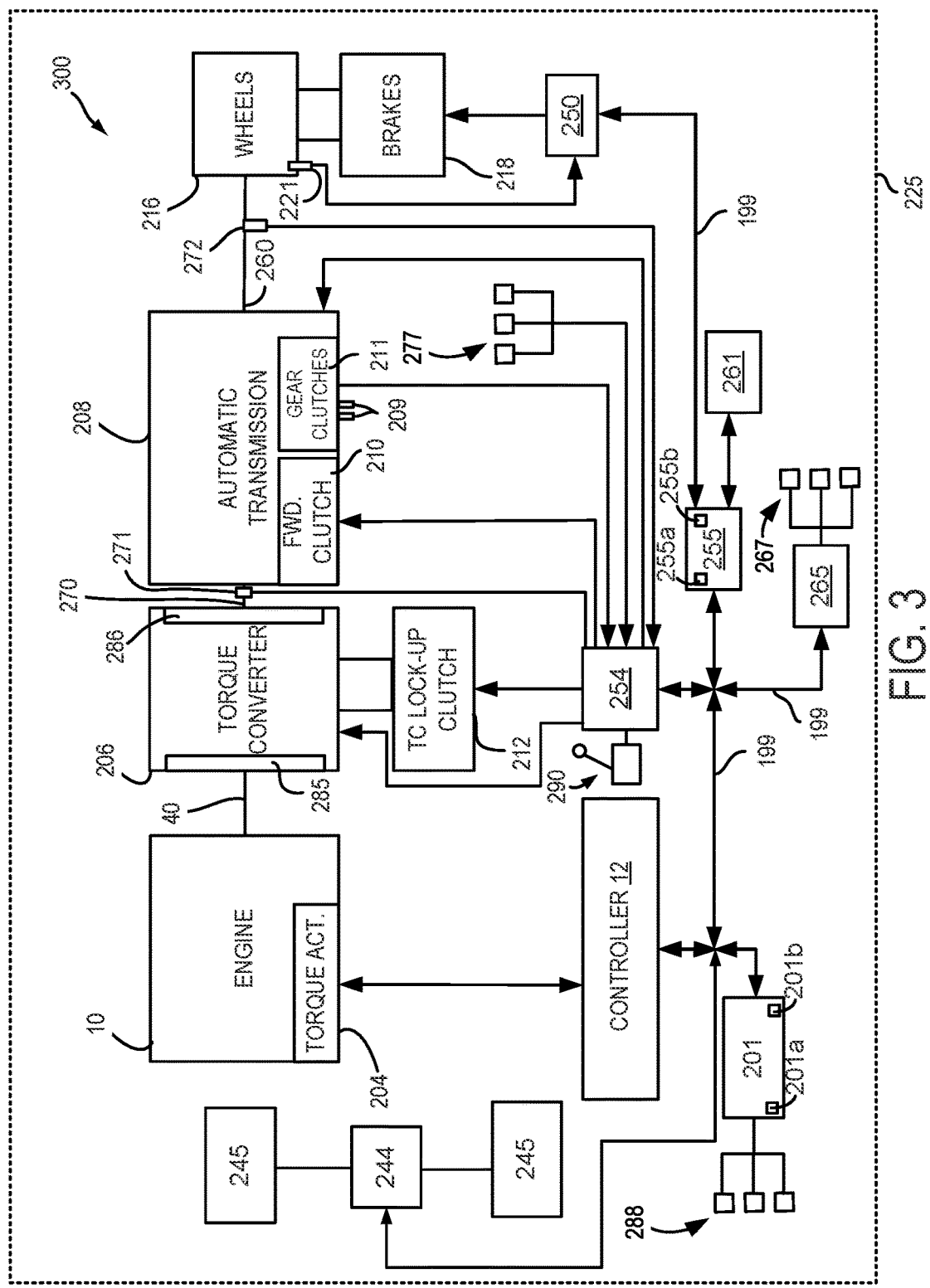
FIG. 3 shows a schematic diagram of a second vehicle driveline that includes the internal combustion engine shown in FIG. 1.
Figure 4:
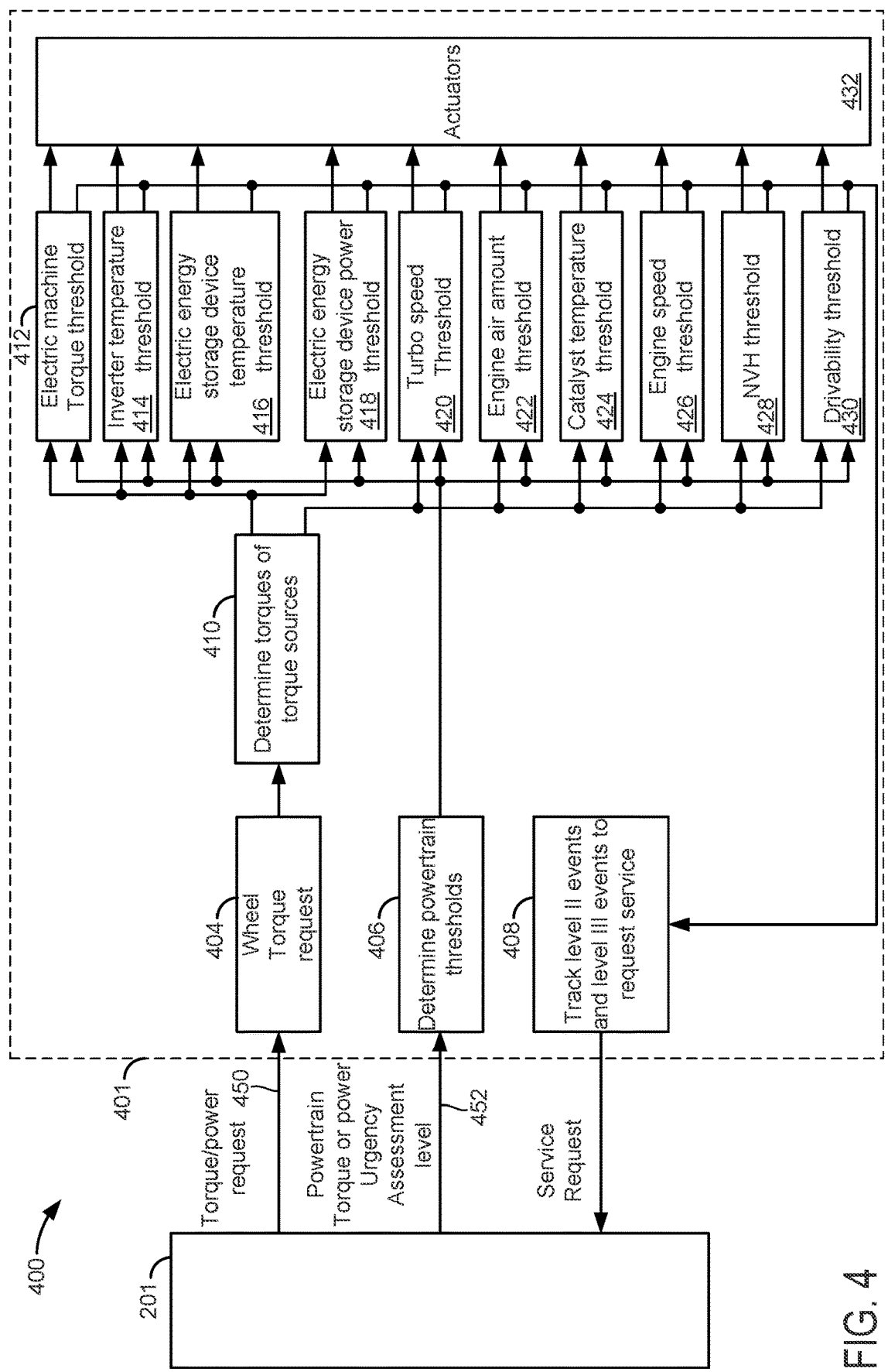
FIG. 4 shows a control block diagram that illustrates system components and signal flow through a vehicle powertrain.
Figure 5:
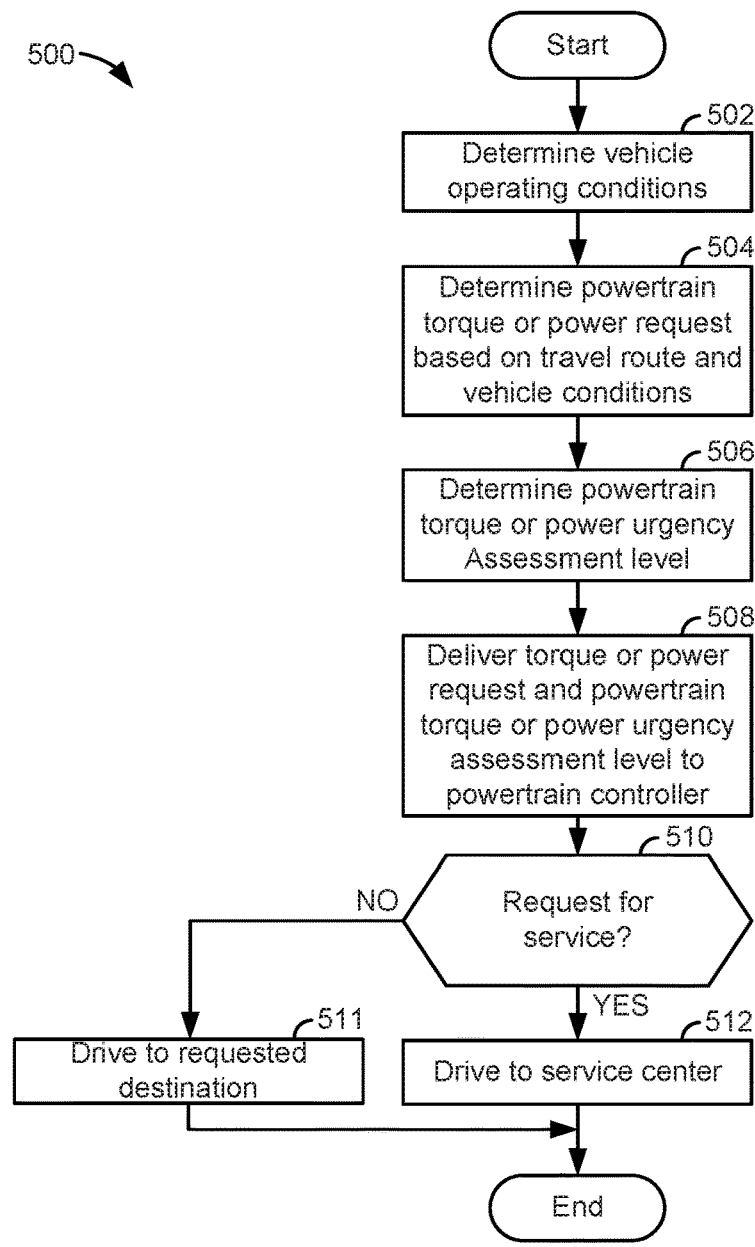
FIG. 5 shows a method for operating an autonomous driver.
Figure 6:
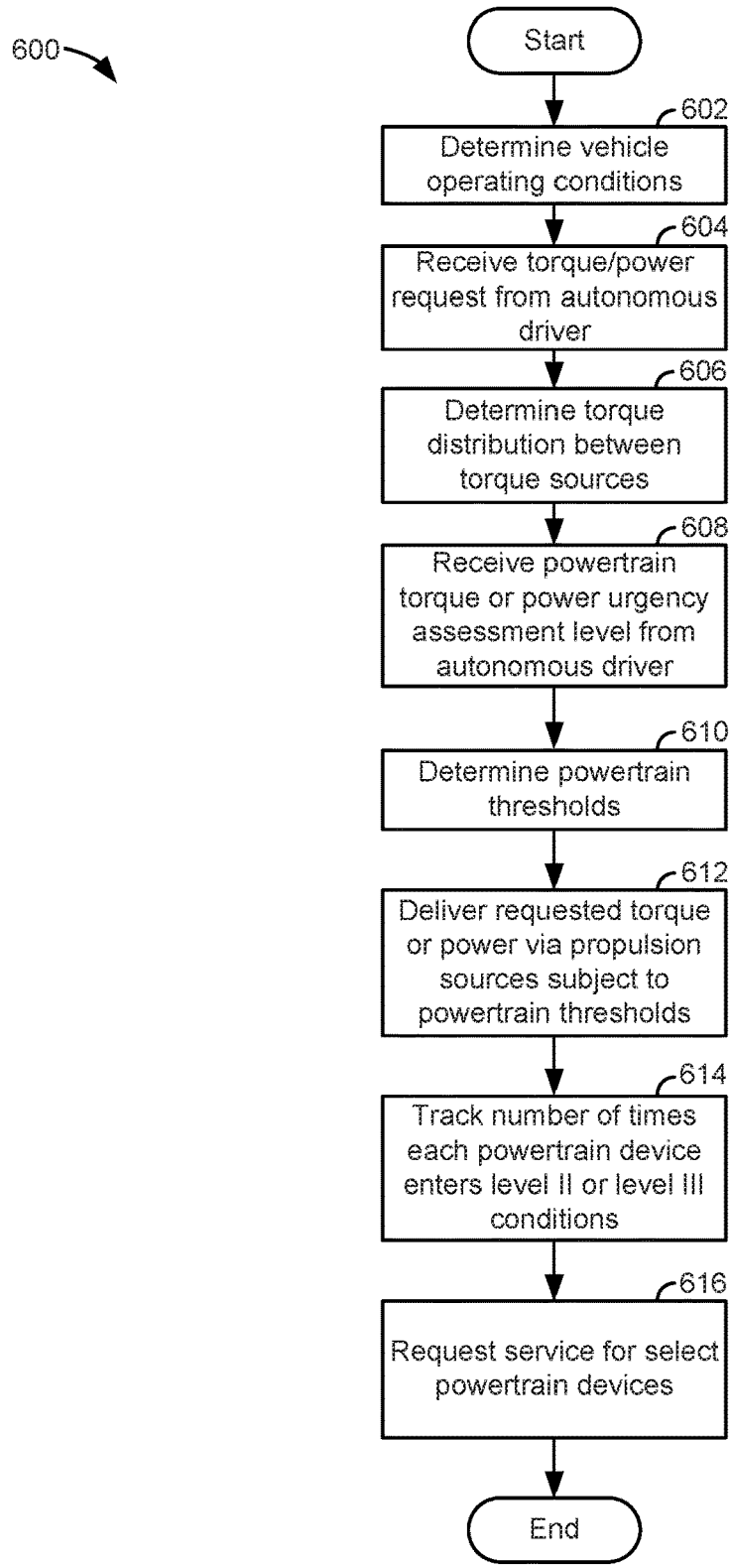
FIG. 6 shows a method for operating a powertrain controller.
Figure 7:
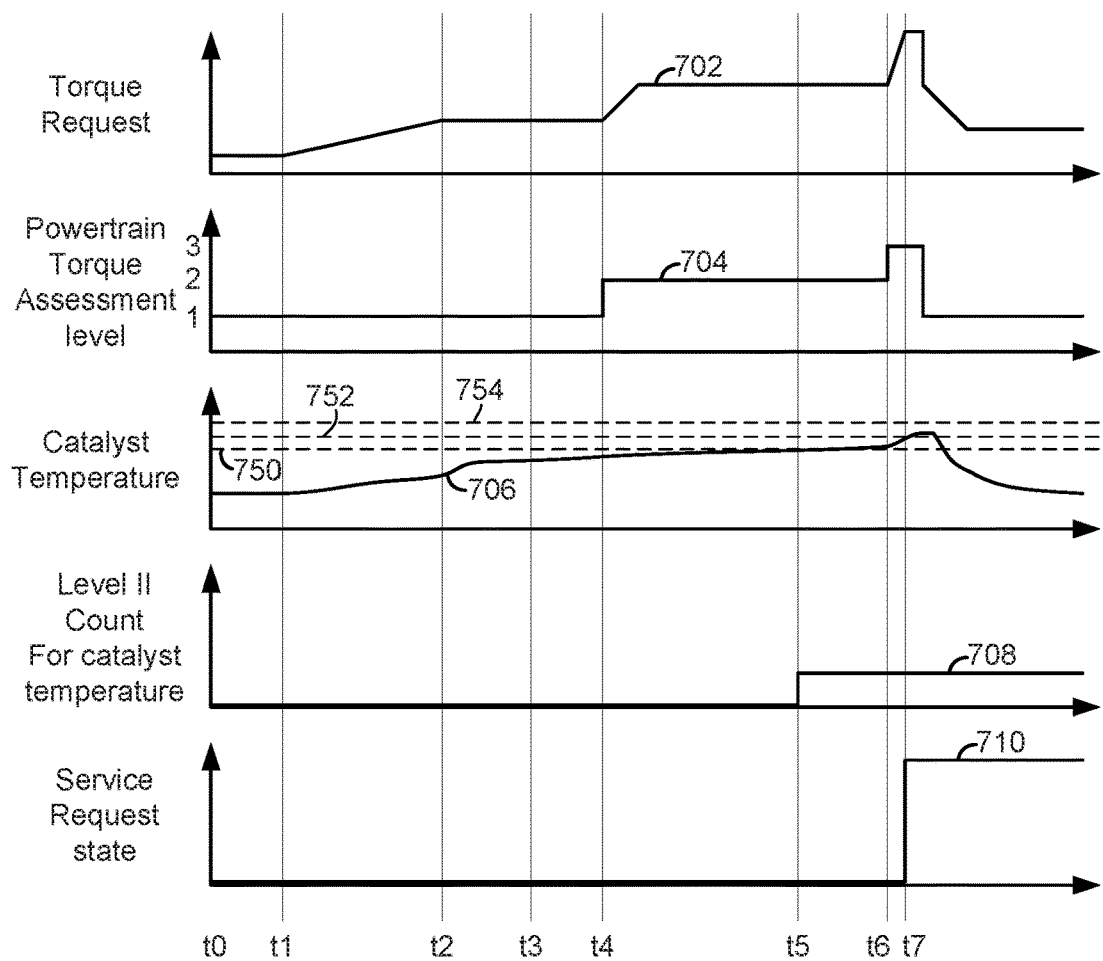
FIG. 7 shows a vehicle operating sequence according to the methods of FIGS. 5 and 6.

The present description is related to controlling torque of a powertrain and meeting powertrain desired outcomes. The present description may be useful for operating vehicles that include an autonomous driver (e.g., an automated non-human driver such as an embedded controller that provides commands to a vehicle so that the vehicle moves to a requested destination). FIG. 1 shows an engine that may be included in a powertrain. The engine may be included in different powertrain configurations as shown in FIGS. 2 and 3. However, the present description also applies to other powertrain configurations that are not shown. For example, the present description is applicable to full electric vehicles that include only electric machines as propulsion sources. A control system block diagram is shown in FIG. 4 to illustrate example powertrain components and signal flow. Methods for operating a vehicle are shown in FIGS. 5 and 6. Finally, an example vehicle operating sequence according to the methods of FIGS. 5 and 6 is shown in FIG. 7.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may receive torque requests and engine braking requests via a controller area network 199.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, brake controller 250, autonomous driver 201, steering angle controller 244, and vehicle human occupant monitor 265. The controllers, autonomous driver, and vehicle human occupant monitor may communicate over controller area network (CAN) 199. Each of the devices that are coupled to CAN 199 may provide information to other devices that are coupled to CAN 199 such as power output limits (e.g., power output of the device or component being controlled not to be exceeded), power input limits (e.g., power input of the device or component being controlled not to be exceeded), power output of the device being controlled, requested steering angle, sensor and actuator data, diagnostic information (e.g., information regarding a degraded transmission, information regarding a degraded engine, information regarding a degraded electric machine, information regarding degraded brakes), powertrain torque requests, powertrain braking requests, human passenger vital signs (e.g., blood pressure, heart rate, respiration rate, etc.), and passenger urgency requests, etc. Further, the vehicle system controller 255 may provide commands to engine controller 12, electric machine controller 252, steering angle controller 244, transmission controller 254, autonomous driver, and brake controller 250 to achieve autonomous driver and human passenger input requests and other requests that are based on vehicle operating conditions.

For example, in response to an autonomous driver reducing a driver demand torque and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation. Vehicle system controller 255 includes a processor 255a and non-transitory memory 255b.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers. The autonomous driver 201 and the vehicle human occupant monitor 265 may be integrated into the vehicle system controller too.

In this example, powertrain 200 may be powered by engine 10 and electric machine 240. In other examples, engine 10 may be omitted. Engine 10 may be started with an engine starting system shown in FIG. 1, or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or a BISG. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to an autonomous driver requesting a braking torque via CAN 199 and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the autonomous driver cancelling a request for braking torque via CAN 199, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from the autonomous driver 201. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking made via the autonomous driver 201, vehicle system controller may provide a negative desired wheel power (e.g., desired or requested powertrain wheel power) based on vehicle speed and a braking request made via the autonomous driver 201. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from a brake pedal sensor directly or over CAN 199. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Autonomous driver 201 includes a processor 201a and non-transitory memory 201b and it may receive vehicle operating conditions from sensors 288. Sensors 288 may include sensors light detection and ranging sensors (LIDAR), radio ranging sensors (RADAR), cameras, and global positioning system sensors (GPS). Autonomous driver 201 may select a vehicle travel route based on a destination that is input via vehicle passengers or an external controller. Autonomous driver 201 may also request driveline or powertrain torque and braking torque amounts in response to road conditions and sensor inputs. In addition, autonomous driver 201 may also output a powertrain torque urgency assessment level for setting and evaluating powertrain threshold values or levels. Autonomous driver 201 may issue steering, braking, and torque or power commands to the vehicle system controller 255 to return a vehicle to a vehicle service center 291 in response to a request to service the vehicle. Steering controller 244 may adjust an angle of front wheels 245 to generate the requested steering angle. Autonomous driver 201 may communicate the powertrain torque or power request, braking request, and powertrain torque urgency assessment level to vehicle system controller 255 via CAN 199 or via direct inputs (e.g., digital inputs).

In one example, the powertrain torque or power urgency assessment level may be an integer value between 1 and 3. However, additional or fewer powertrain torque urgency assessment levels may be provided, if desired. In one example, a powertrain torque or power urgency assessment level of one indicates a lower level of powertrain torque urgency. A powertrain torque or power urgency assessment level of two indicates a medium level of powertrain torque urgency. A powertrain torque or power urgency assessment level of three indicates a high level of powertrain torque urgency. A level one powertrain torque or power urgency level signals the powertrain system that the urgency to deliver the requested powertrain torque is low so that powertrain devices should be operated in a way that they may be expected to operate for their full useful life (e.g., a predetermined vehicle travel distance (150,000 miles) or a predetermined amount of operating time (2500 hours)). A level two powertrain torque or power urgency level signals the powertrain system that the urgency to deliver the requested powertrain torque is medium so that powertrain devices may be operated for a predetermined number of times at elevated performance levels where they may begin to degrade before their full useful life. A level three powertrain torque or power urgency level signals the powertrain system that the urgency to deliver the requested powertrain torque is high so that powertrain devices may be operated for a single time at elevated performance levels where they may begin to degrade in a single use at the elevated performance levels.

The autonomous driver 201 may select or generate a powertrain torque or power urgency assessment level in response to vehicle operating conditions including urgency requests input to human/machine interface 261 via human vehicle passengers 292, inputs from sensors 288, and input from vehicle human occupant monitor 265. Vehicle human occupant monitor 265 may request higher levels of powertrain torque urgency in response to a human's blood pressure, respiration rate, heart beat rate, and other human vital conditions as determined via sensors 267 including blood pressure sensors, heart beat sensors, and respiration rate sensors. Human/machine interface 261 may comprise a display panel with touch input for displaying and receiving data and inputs from human passengers 292.

Referring now to FIG. 3, a second example vehicle driveline system 300 is shown. The system of FIG. 3 includes many of the same powertrain components described in FIG. 2. The identification numbers assigned to powertrain components described in FIG. 2 are carried over into FIG. 3. Specifically, powertrain components identified with a particular number in FIG. 2 and that are carried over in FIG. 3 are illustrated with a same number. For example, engine 10 in FIG. 2 is the same engine 10 shown in FIG. 3.

The system of FIG. 3 includes fewer components than the system that is shown in FIG. 2. In particular, the system of FIG. 3 does not include an ISG 240 and its related components. However, vehicle 225 may be driven via an autonomous driver 201 and receive input via human/machine interface 261 and vehicle human occupant monitor as previously described. Further, the system of FIG. 3 may operate as previously described with the exception of functions that were attributed to ISG 240.

The systems of FIGS. 1-3 provides for a vehicle system, comprising: a propulsion source; an autonomous driver; and a controller including executable instructions stored in non-transitory memory to receive a powertrain torque or power request and a powertrain torque or power urgency assessment via the autonomous driver and adjust output torque or power of the propulsion source in response to the powertrain torque or power request and request vehicle service responsive to one or more vehicle control parameters exceeding one or more threshold levels based on the powertrain torque or power urgency assessment. The vehicle system includes where the powertrain torque or power urgency assessment is based on vehicle operating conditions. The vehicle system includes where the powertrain torque or power urgency assessment is based on vital signs of one or more vehicle occupants. The vehicle system includes where the powertrain torque or power urgency assessment is based in input from one or more vehicle occupants. The vehicle system includes where the one or more vehicle control parameters includes a turbocharger speed.

Referring now to FIG. 4, a control block diagram that illustrates system components and data flow for the method and system described herein is shown. Portions of block diagram 400 may be included in the system shown in FIGS. 1-3 and may perform in cooperation with the method of FIGS. 5 and 6.

Block diagram 400 shows autonomous driver 201 in communication with powertrain control system 401, which may include but is not limited to engine controller 12, vehicle system controller 255, electric machine controller 252, transmission controller 254, energy storage device controller 253, brake controller 250, steering angle controller 244, and vehicle human occupant monitor 265. Further, powertrain control system includes actuators 432 that may include but are not limited to engine torque actuators 204, ISG 240, transmission 208, brakes 218, torque converter 206, and other actuators described in FIGS. 2 and 3.

Autonomous driver 201 sends a powertrain torque or power request and a powertrain torque or power urgency assessment level to the powertrain control system 401 as indicated by arrows 450 and 452. In one example, vehicle system controller 255 shown in FIG. 2 receives these parameters; however, engine controller 12 and/or other controllers may receive these control parameters from the autonomous driver 201. The powertrain torque or power request may be received as a wheel torque or power request or it may be converted to a wheel torque or power request if the torque or power request is a torque or power request at a different powertrain position. For example, if the autonomous driver outputs a transmission input torque or power, the transmission input torque or power may be converted to a wheel torque or power via adjusting the transmission input torque or power for the transmission gear ratio, final drive ratio, and wheel radius at block 404. The wheel torque or power is then requested from one or more of the powertrain propulsion sources (e.g., the engine, the electric machine, or a combination of the engine and the electric machine). In one example, the torque or power amounts requested from the powertrain propulsion sources may be a function of battery state of charge, amount of torque or power requested, and other vehicle operating conditions. Block 410 then outputs control parameter values for powertrain devices that may operate in concert to provide the requested powertrain torque or power. For example, block 410 may output an electric machine torque to block 412. Block 410 also outputs a present inverter temperature to block 414, an electric energy storage device temperature to block 416, an electric energy storage device output power to block 418, a present turbocharger speed to block 420, a present engine air amount to block 422, a present catalyst temperature to block 424, a present engine speed to block 426, a present powertrain noise vibration and harshness assessment to block 428, and a present powertrain drivability estimate to block 430. The powertrain control parameters input to blocks 412-430 is not intended to be an exhaustive list of powertrain control parameters and other powertrain control parameters may also be included, if desired. The powertrain control parameters may be related to the requested powertrain torque or power level.

The powertrain torque or power urgency level is input to block 406. Block 406 outputs powertrain thresholds for each of blocks 412-430 and any other blocks for other powertrain control parameters that may be desired. Block 406 may output different threshold for each level of powertrain torque or power urgency assessment level. For example, an electric machine torque threshold level for a level one powertrain torque urgency assessment level may be 250 Newton-meters, an electric machine torque threshold level for a level two powertrain torque urgency assessment level may be 255 Newton-meters, and an electric machine torque threshold level for a level three powertrain torque urgency assessment level may be 265 Newton-meters.

Blocks 412-430 then compare inputs received from block 410 to threshold levels received from block 406. If one of the blocks 412-430 determines that its input parameter exceeds a level one powertrain torque urgency assessment level threshold, thereby entering operating conditions where the powertrain device may begin to degrade before its full useful life it the powertrain device is operated in the region for a predetermined number of times or for longer than a predetermined time duration (e.g., level two powertrains torque urgency operating conditions for the device), then the block outputs such information to block 408. Likewise, if one of the blocks 412-430 determines that its input parameter exceeds a level two powertrain torque urgency assessment level threshold, thereby entering operating conditions where the powertrain device may begin to degrade upon exceeding the level two powertrain torque urgency assessment level threshold, then the block outputs such information to block 408.

For example, if the level one electric machine torque threshold is 250 Newton-meters, the level two electric machine torque threshold is 255 Newton-meters, and the level three electric machine torque threshold is 265 Newton-meters and the present electric machine torque output is 252 Newton-meters, then block 412 indicates to block 408 that the electric machine has entered the level two powertrain torque level. However, if the present electric machine torque output is 257 Newton-meters, then block 412 indicates to block 408 that the electric machine has entered the level three powertrain torque level.

Block 408 tracks each time one of blocks 412-430 enter the level two powertrain torque level. If one of the blocks 412-430 indicates that a powertrain control parameter has entered level two powertrain conditions more than a predetermined number of times, then block 408 requests that the autonomous driver proceed to a service station for maintenance. Alternatively, if one of the blocks 412-430 indicates that a powertrain control parameter has entered level three powertrain conditions once, then block 408 requests that the autonomous driver proceed to a service station for maintenance.

Blocks 412-430 may output commands to actuators 432 so that the torque or power that is requested via the autonomous driver may be provided via the powertrain. Further, if one of the threshold levels of blocks 412-430 is exceeded, blocks 412-430 may limit the extent that the threshold may be exceeded. For example, if block 406 outputs an electric machine torque threshold of 250 Newton-meters based on a powertrain torque urgency assessment level of one, then block 416 may limit electric machine torque output to less than 255 Newton-meters.

In this way, control parameters of powertrain components may be compared against threshold levels that are associated with powertrain degradation levels. If a powertrain control parameter exceeds a threshold level, then an autonomous driver may be requested to return the vehicle to a service station for maintenance. By operating a vehicle in this way, it may be possible to provide greater powertrain output during vehicle operating conditions where higher vehicle performance carries a higher priority. Further, desirable levels of powertrain output may be provided while extending powertrain component life during operating conditions where higher vehicle performance may be less of a priority.

Referring now to FIG. 5, a method for operating an autonomous driver is shown. The method of FIG. 5 may operate in cooperation with the method of FIG. 6. At least portions of method 500 may be implemented as executable controller instructions stored in non-transitory memory of an autonomous driver. Method 500 may operate in cooperation with the system of FIGS. 1-3. Additionally, portions of method 500 may be actions taken in the physical world to transform an operating state of an actuator or device.

At 502, method 502 determines vehicle operating conditions including but not limited to distance to the nearest object in the vehicle's forward path, travel route, vehicle speed limit, weather conditions, engine temperature, engine speed, engine load, electric machine speed, electric machine load, present vehicle speed, road grade, and battery state of charge. Method 500 proceeds to 504.

At 504, method 500 method 500 determines a powertrain wheel torque or power request based on the vehicle travel route and vehicle operating conditions. In one example, method 500 estimates an amount of wheel torque or power to accelerate or decelerate the vehicle from its present speed to the posted vehicle speed subject to traffic ahead of the vehicle, objects in the vehicle's travel path, road grade, traffic signals, and vehicle drivability constraints. Method 500 may employ one or more of a rule based controller (e.g., fuzzy controller), machine learning algorithms, pattern recognition algorithms, and/or other known type of controller to generate a powertrain wheel torque or power request. Method 500 proceeds to 506.

At 506, method 500 determines a powertrain torque or power urgency assessment level. The powertrain torque or power urgency assessment level classifies the powertrain torque or power request according to powertrain component degradation that may result from operating the powertrain at the powertrain torque or power urgency assessment level. The powertrain torque urgency assessment level may be an integer value between 1 and 3. However, additional or fewer powertrain torque urgency assessment levels may be provided, if desired. In one example, a powertrain torque urgency assessment level of one indicates a lower level of powertrain torque urgency. Powertrain components may be expected to operate for their full useful life (e.g., a predetermined vehicle travel distance (150,000 miles) or a predetermined amount of operating time (2500 hours)) when the powertrain components are operated at powertrain conditions are at a level one powertrain torque urgency assessment level. A powertrain torque urgency assessment level of one may be identified as a predetermined lower bounded range of powertrain torque output (e.g., from 0 Newton-meters to 350 Newton-meters of torque). A powertrain torque urgency assessment level of two indicates a medium level of powertrain torque urgency. A level two powertrain torque urgency level signals the powertrain system that the urgency to deliver the requested powertrain torque is medium so that powertrain devices may be operated for a predetermined number of times (e.g., 200 occurrences) at elevated performance levels where they may begin to degrade before their full useful life. A powertrain torque urgency assessment level of two may be identified as a predetermined medium bounded range of powertrain torque output (e.g., from 351 Newton-meters to 400 Newton-meters of torque). A powertrain torque urgency assessment level of three indicates a high level of powertrain torque urgency. A level three powertrain torque urgency level signals the powertrain system that the urgency to deliver the requested powertrain torque is high so that powertrain devices may be operated for a single time at elevated performance levels where they may begin to degrade in a single use when operated at the elevated performance levels. A powertrain torque urgency assessment level of three may be identified as a predetermined higher bounded range of powertrain torque output (e.g., above 401 Newton-meters of torque).

In one example, the autonomous driver may select or request a level one powertrain torque urgency assessment level when vehicle human occupants do not specify a powertrain torque urgency assessment level or when the vehicle human occupants specifically request a level one powertrain torque urgency assessment level via the human/machine interface. The autonomous driver may select a level two powertrain torque urgency assessment level when vehicle human occupants specifically request a level two powertrain torque urgency assessment level via the human/machine interface. Likewise, the autonomous driver may select a level three powertrain torque urgency assessment level when vehicle human occupants specifically request a level two powertrain torque urgency assessment level via the human/machine interface. In addition, the autonomous driver may select a level two or three powertrain torque urgency assessment level during specialized vehicle operating conditions. For example, the autonomous driver may select or request a powertrain torque urgency assessment level (e.g., level two or level three) responsive to the vehicle traveling off-road or on a competitive track as determined via the GPS system. Further still, the autonomous driver may select a powertrain torque or power urgency assessment level (e.g., level two or a level three) responsive to vital signs (e.g., heart beat rate, respiration rate, and/or blood pressure) of human occupants in the vehicle. For example, if the human's heat beat is slower than a first threshold or faster than a second threshold, a level two powertrain torque or power urgency assessment level may be requested via the autonomous driver. The autonomous driver may select or request the powertrain torque urgency assessment level in response the human's other vital signs in a similar way. The vital signs of the human occupants may be transferred to the autonomous driver via a human occupant monitor 265 or the human occupant monitor may specifically signal to the autonomous driver that the vehicle occupant's situation is urgent and that the vehicle's travel destination should be reached in a short amount of time. Method 500 proceeds to 508.

At 508, method 500 requests the torque or power from the powertrain and supplies the powertrain torque or power urgency assessment level to one or more powertrain controllers. In one example, method 500 requests torque or power from the vehicle system controller and informs the vehicle system controller of the powertrain torque or power urgency assessment level. The autonomous driver may deliver the torque or power request and the powertrain torque or power urgency assessment level via the CAN or via other inputs to the vehicle system controller. In other examples, method 500 may request torque or power from the engine controller and/or the electric machine controller. Further, method 500 informs the engine controller and the electric machine controller of the powertrain torque or power urgency assessment level. Method 500 proceeds to 510.

At 510, method 500 judges if the autonomous driver has received a request to service the vehicle. The vehicle system controller, engine controller, electric machine controller, or other powertrain controller may request vehicle service so that the vehicle may continue to operate as expected. The request for service may be received via the CAN or other inputs of the autonomous driver. If method 500 judges that a request for vehicle service is requested, the answer is yes and method 500 proceeds to 512. Otherwise, the answer is no and method 500 proceeds to 511.

At 512, method 500 sends commands to the steering system, braking system, and powertrain to drive the vehicle to a service station where powertrain components may be inspected and replaced if degradation is observed. Method 500 may drive the vehicle to the service center after a presently selected destination has been reached by the vehicle. Method 500 proceeds to exit.

At 511, method 500 sends commands to the steering system, braking system, and powertrain to drive the vehicle to the vehicle's destination. The vehicle's destination may be input via the human/machine interface or directly into the autonomous driver via a human or a Wi-Fi signal. Method 500 proceeds to exit.

In this way, an autonomous driver may request torque or power from a powertrain. In addition, the autonomous driver may determine a powertrain torque or power urgency assessment level and communicate the powertrain torque or power urgency assessment level to one or more powertrain controllers.

Referring now to FIG. 6, a method for operating an autonomous driver is shown. The method of FIG. 6 may operate in cooperation with the method of FIG. 5. At least portions of method 600 may be implemented as executable controller instructions stored in non-transitory memory of a powertrain controller. Method 600 may operate in cooperation with the system of FIGS. 1-3. Additionally, portions of method 600 may be actions taken in the physical world to transform an operating state of an actuator or device.

At 602, method 602 determines vehicle operating conditions including but not limited to engine speed, engine load, electric machine speed, electric machine load, present vehicle speed, and battery state of charge. Method 600 proceeds to 604.

At 604, method 600 receives a wheel power or torque request from an autonomous driver. The wheel power or torque request may be received via a CAN or other controller inputs. In some examples, method 600 may limit the wheel power or torque request responsive to powertrain drivability, powertrain noise, vibration, and harshness. Method 600 receives the wheel power or torque request and proceeds to 606.

At 606, method 600 determines the distribution of the requested wheel torque or power between the vehicle's powertrain propulsion sources. In one example, method 600 may determine the distribution of wheel torque or power between the vehicle's powertrain propulsion sources via logic in controller memory. For example, if driver demand wheel power or torque is low and state of battery charge is high, method 600 may allocate all of the torque or power that is requested by the autonomous driver to an electric machine. If driver demand wheel power or torque is low and state of battery charge is low, method 600 may allocate all of the wheel torque or power that is requested by the autonomous driver to an internal combustion engine. If driver demand wheel power or torque is greater than a first threshold and less than a second threshold, method 600 may allocate all of the wheel torque or power that is requested by the autonomous driver to the internal combustion engine. If driver demand wheel power or torque is greater than the second threshold, method 600 may allocate a first portion of the wheel torque or power that is requested by the autonomous driver to an electric machine and a second portion of the wheel torque or power that is requested by the autonomous driver to the internal combustion engine.

Once the requested wheel torque or power is allocated to the powertrain propulsion sources, method 600 determines the torque or power to be produced by each propulsion source that is allocated a fraction of the requested wheel torque or power. Method 600 multiplies a wheel torque that is allocated to a particular propulsion source via the present gear ratios between the wheels and the propulsion source and divides the result by the driveline efficiency. For example, if an engine is allocated 75% of a requested wheel torque of 800 Newton-meters (Nm) and the torque converter is locked, method 600 may determine the requested engine torque via the following equation:

$$Teng = \frac{Teng\_all \times Whl\_req \times GR}{Eff\_drv}$$

where Teng is the requested engine torque, Teng_all is the fraction of requested wheel torque that is allocated to the engine (e.g., 0.75 for 75%), Whl_req is the requested wheel torque, and GR is the gear ratio including transmission gear ratio and final drive ratio between the wheel and the engine, and Eff_drv is the driveline efficiency between the wheel and the engine. Additional adjustments may be made for the torque converter if the torque converter is unlocked. Torque amounts or power amounts for the other propulsion sources (e.g., electric machines) that have been allocated a fraction of the requested wheel torque may be determined in a similar way.

Method 600 may also convert one or more of the requested torques or powers into a normalized torque or power request. For example, engine torque may be normalized to an engine load value that may range between 0 and 1, where zero is no engine load and 1 is the engine operating at full engine load (e.g., wide open throttle). The engine load may be determined via dividing the present engine air flow amount by a maximum theoretical engine air flow amount. The engine load may then be converted into a desired engine air flow rate and the engine air flow rate may be converted into a throttle angle. In addition, a turbocharger compressor speed, waste gate position, and compressor bypass valve position may be determined from the desired engine air flow and the present engine speed. Method 600 may also determine fuel injection amount and desired catalyst temperature for the requested engine torque and present engine speed.

Method 600 may also determine electric current amount for electric machines and electric energy storage devices. In one example, method 600 determines an amount of electric current to supply to an electric machine via referencing a table or function that outputs an electric current amount for an electric machine when the table or function is referenced by the electric machine's present speed and the requested torque or power amount of the electric machine. The electric energy storage current output may be equal to the amount of electric current that is consumed by the electric machine to provide the amount of power or torque that is requested from the electric machine. However, if the electric machine is provided with electrical power via the electric energy storage device and another electric machine, then the amount of electric current that is requested output from the electric energy storage device may be less than the amount of electric current that is consumed via the electric machine. Method 600 proceeds to 610 after allocating the requested powertrain power or torque to the powertrain propulsion sources.

At 608, method 600 receives a powertrain wheel torque or power urgency assessment level from an autonomous driver. The powertrain wheel torque or power urgency assessment level may be received via a CAN or other controller inputs. Method 600 may accept and apply the powertrain wheel torque or power urgency assessment level as received from the autonomous driver, or method 600 may override the received powertrain wheel torque or power urgency assessment level and simply only allow a level one powertrain wheel torque or power urgency assessment level if vehicle service has not been performed at requested intervals or when it has been requested. Method 600 receives the powertrain wheel torque or power urgency assessment level and proceeds to 610.

At 610, method 600 determines powertrain threshold limits and the powertrain threshold limits may include governing powertrain threshold limits and non-governing powertrain threshold limits. The governing powertrain thresholds may be a function of or be based on the received powertrain wheel torque or power urgency assessment level, and the non-governing powertrain threshold limits may be a function of or based on powertrain wheel torque or power urgency levels that are not received via the powertrain controllers from the autonomous driver. The governing and non-governing powertrain threshold limits may include but are not limited to electric machine torque thresholds, engine torque thresholds, electric energy storage device output current thresholds, turbocharger compressor speed thresholds, turbocharger temperature thresholds, inverter electric current output thresholds, inverter temperature thresholds, electric machine temperature thresholds, engine air amount thresholds, catalyst temperature thresholds, powertrain noise, vibration, and harshness thresholds, drivability thresholds, and electric energy storage device temperature thresholds. Of course, additional powertrain thresholds may be provided for other powertrain components that may degrade when the powertrain is operating under level one, level two, or level three powertrain wheel torque or power urgency assessment levels. The powertrain is operated so as to not exceed governing powertrain thresholds.

The governing powertrain thresholds may be such that each powertrain component has less possibility of degrading when the governing powertrain thresholds are based on a level one powertrain wheel torque or power urgency assessment level. The governing powertrain thresholds may be such that each powertrain component has more possibility of degrading when the governing powertrain thresholds are based on a level two powertrain wheel torque or power urgency assessment level. But when the governing powertrain thresholds are based on the level two powertrain wheel torque or power urgency assessment level, the powertrain components have less possibility of degrading as compared to when the governing powertrain thresholds are based on a level three powertrain wheel torque or power urgency assessment level. The governing powertrain thresholds may be such that each powertrain component has a higher possibility of degrading when the governing powertrain thresholds are based on a level three powertrain wheel torque or power urgency assessment level.

For example, a governing engine torque threshold that is based on a level one powertrain wheel torque or power urgency assessment level and that is not to be exceeded by actual engine torque or power may be an engine torque threshold of 300 Nm. However, the governing engine torque threshold that is based on a level two powertrain wheel torque or power urgency assessment level and that is not to be exceeded by actual engine torque or power may be an engine torque threshold of 350 Nm. Further, the governing engine torque threshold that is based on a level three wheel torque or power urgency assessment level and that is not to be exceeded by actual engine torque or power may be an engine torque threshold of 375 Nm. The non-governing engine torque thresholds for level two and level three powertrain wheel torque or power urgency assessment levels are 350 Nm and 375 Nm when the governing engine torque threshold is based on the level one powertrain wheel torque or power urgency assessment level. The non-governing engine torque thresholds for level one and level three powertrain wheel torque or power urgency assessment levels are 300 Nm and 375 Nm when the governing engine torque threshold is based on the level two powertrain wheel torque or power urgency assessment level. The non-governing engine torque thresholds for level one and level two powertrain wheel torque or power urgency assessment levels are 300 Nm and 350 Nm when the governing engine torque threshold is based on the level three powertrain wheel torque or power urgency assessment level. Thus, engine torque thresholds for each powertrain torque or power urgency assessment level may be provided, but the governing engine torque threshold may be based only on the powertrain torque or power urgency assessment level that is presently requested via the autonomous driver. Governing and non-governing thresholds for the other engine control parameters (e.g., electric machine torque, engine torque, electric energy storage device output current, turbocharger compressor speed, etc.) may be adjusted for the powertrain wheel torque or power urgency assessment level in a similar way. Method 600 proceeds to 612.

At 612, method 600 commands the powertrain propulsion sources to deliver the torques determined at 606 based on the torques they were allocated to provide according to the requested wheel torque. However, if a control parameter, including engine torque and/or electric machine torque, reaches its associated governing threshold level, then mitigating actions may be taken so that the control parameter does not exceed its associated governing threshold level. For example, if a level one powertrain torque or power urgency assessment level is requested and the governing threshold engine torque is 350 Nm, then an engine throttle opening amount and/or fuel injection amount may not be increased once engine torque reaches 350 Nm. In this way, engine control parameters may be restricted to values less than or equal to their associated governing threshold levels. Method 600 proceeds to 614.

At 614, method 600 tracks a number of times that each powertrain control parameter exceeds a threshold that is based on a level one powertrain torque or power urgency assessment. In other words, method 600 tracks a number of times that each powertrain control parameter enters operating conditions that are allowed when the powertrain torque or power urgency assessment level is two but that are not allowed when the powertrain torque or power urgency assessment level is one. For example, if the powertrain torque urgency assessment level is two, a catalyst threshold temperature is 800° C. for a powertrain torque urgency assessment level of one (e.g., the non-governing catalyst threshold temperature), a catalyst threshold temperature is 850° C. for a powertrain torque urgency assessment level of two (e.g., the governing catalyst threshold temperature), and a temperature of a catalyst cycles between 700° C. and 820° C. two times during a drive cycle, then a total number of times that the catalyst has exceeded the level one threshold catalyst temperature is incremented by two. Method 600 tracks the number of times that each of the other powertrain control parameters exceeds its threshold that is based on the level one powertrain torque or power urgency assessment level in a similar way.

In addition, method 600 tracks a number of times that each powertrain control parameter exceeds a threshold that is based on a level two powertrain torque or power urgency assessment. In other words, method 600 tracks a number of times that each powertrain control parameter enters operating conditions that are allowed when the powertrain torque or power urgency assessment level is three. For example, if the powertrain torque urgency assessment level is three, a catalyst threshold temperature is 800° C. for a powertrain torque urgency assessment level of one (e.g., the non-governing catalyst threshold temperature), a catalyst threshold temperature is 850° C. for a powertrain torque urgency assessment level of two (e.g., the non-governing catalyst threshold temperature), a catalyst threshold temperature is 870° C. for a powertrain torque urgency assessment level of three (e.g., the governing catalyst threshold temperature), and a temperature of a catalyst cycles between 800° C. and 860° C. two times during a drive cycle, then a total number of times that the catalyst has exceeded the level two threshold catalyst temperature is incremented by two. Method 600 tracks the number of times that each of the other powertrain control parameters exceeds its threshold that is based on the level two powertrain torque or power urgency assessment level in a similar way. Method 600 proceeds to 616.

At 616, method 600 requests service for select powertrain devices by sending a service request to the autonomous driver when one of the powertrain control parameters exceeds its threshold that is based on the level one powertrain torque or power urgency assessment level a predetermined number of times since the time of vehicle manufacture. For example, if turbocharger compressor speed has exceeded a threshold turbocharger compressor speed that is based on the level one powertrain torque or power urgency assessment level a predetermined number of times since the time of vehicle manufacture, method 600 requests that the autonomous driver proceed to a vehicle service center for service on the turbocharger compressor. Further, method requests service for select powertrain devices by sending a service request to the autonomous driver when one of the powertrain control parameters exceeds its threshold that is based on the level two powertrain torque or power urgency assessment level a single time. Method 600 proceeds to exit.

In this way, method 600 may adjust powertrain operation to prevent some powertrain from exceeding threshold levels that are based on powertrain wheel torque or power urgency assessment levels. Further, method 600 may change threshold levels that govern powertrain operation to meet objectives of vehicle occupants and/or vehicle owners/operators.

Thus, the method of FIG. 6 provides for a vehicle operating method, comprising: generating a powertrain torque or power request and a powertrain torque or power urgency assessment via an autonomous driver; and adjusting powertrain output torque or power in response to the powertrain torque or power request and monitoring one or more control parameters. The method further comprises determining an actual total number of times the one or more control parameters exceed one or more threshold levels. The method further comprises adjusting the one or more threshold levels responsive to the powertrain torque or power urgency assessment. The method includes where the powertrain torque or power urgency assessment is based on input provided via one or more vehicle occupants. The method includes where the powertrain torque or power urgency assessment is based on input provided via one or more vehicle systems. The method includes where the one or more vehicle systems monitor one or more vital signs of a human. The method includes where powertrain torque or power output is adjusted via a controller that receives the powertrain torque or power request from the autonomous driver.

The method of FIG. 6 also provides for a vehicle operating method, comprising: generating a powertrain torque or power request and a powertrain torque or power urgency assessment via an autonomous driver; adjusting powertrain output torque or power in response to the powertrain torque request and monitoring one or more control parameters; and returning a vehicle to a service center via the autonomous driver responsive to the one or more control parameters exceeding a first threshold level a predetermined number of times after completing a drive cycle in which the first threshold level is exceeded the predetermined number of times. The method further comprises returning the vehicle to the service center via the autonomous driver responsive to the one or more control parameters exceeding a second threshold level a single time after completing the drive cycle in which the second threshold level is exceeded. The method further comprises requesting vehicle service via a powertrain controller. The method further comprises communicating the powertrain torque or power request and the powertrain torque or power urgency assessment from the autonomous driver to a vehicle controller. The method includes where adjusting powertrain output torque or power includes adjusting output torque of an engine. The method includes where adjusting powertrain output torque or power includes adjusting output torque of an electric machine. The method includes where the one or more control parameters includes a temperature of an electric energy storage device. The method includes where the one or more control parameters includes a temperature of a catalyst. In another representation, the method of FIG. 6 provides for a vehicle operating method, comprising: generating a powertrain torque or power request and a powertrain torque or power urgency assessment via an autonomous driver; adjusting powertrain output torque or power in response to the powertrain torque or power request and monitoring one or more control parameters; and selecting a powertrain thresholds as a governing threshold responsive to the powertrain torque or power urgency assessment. The method further comprises, comparing a powertrain parameter to the governing threshold. The method further comprises, requesting vehicle service via an autonomous driver in response to the powertrain parameter exceeding a non-governing threshold.

Referring now to FIG. 7, a prophetic operating sequence according to the method of FIG. 6 is shown. The vehicle operating sequence shown in FIG. 6 may be provided via the method of FIG. 6 in cooperation with the system shown in FIGS. 1-3. The plots shown in FIG. 7 occur at the same time and are aligned in time. The vertical lines at t0-t7 represent times of interest during the sequence.

The first plot from the top of FIG. 7 is a plot of a powertrain torque request that is received from an autonomous driver by a powertrain controller versus time. The vertical axis represents the powertrain torque request and the powertrain torque request increases in the direction of the vertical axis arrow. The horizontal axis represents time and time increases from the left side of the figure to the right side of the figure. Trace 702 represents the powertrain torque request.

The second plot from the top of FIG. 7 is a plot of a powertrain torque assessment level that is received via a powertrain controller versus time. The vertical axis represents the powertrain torque assessment level. The horizontal axis represents time and time increases from the left side of the figure to the right side of the figure. Trace 704 represents the powertrain torque assessment level.

The third plot from the top of FIG. 7 is a plot of catalyst temperature versus time. The vertical axis represents catalyst temperature and the catalyst temperature increases in the direction of the vertical axis arrow. The horizontal axis represents time and time increases from the left side of the figure to the right side of the figure. Trace 706 represents the catalyst temperature. Horizontal line 750 represents a catalyst temperature threshold not to be exceeded for a powertrain torque assessment level of one. Horizontal line 752 represents a catalyst temperature threshold not to be exceeded for a powertrain torque assessment level of two. Horizontal line 754 represents a catalyst temperature threshold not to be exceeded for a powertrain torque assessment level of three.

The fourth plot from the top of FIG. 7 is a plot of an actual number of times that catalyst temperature has exceeded the catalyst temperature threshold not to be exceeded for a powertrain torque assessment level of one (e.g., the actual number of times that catalyst temperature has entered permissible catalyst temperatures for a powertrain torque assessment level of two). The vertical axis represents the actual number of times that catalyst temperature has exceeded the catalyst temperature threshold not to be exceeded for a powertrain torque assessment level of one.

The horizontal axis represents time and time increases from the left side of the figure to the right side of the figure. Trace 708 represents the actual number of times that catalyst temperature has exceeded the catalyst temperature threshold not to be exceeded for a powertrain torque assessment level of one.

The fifth plot from the top of FIG. 7 is a plot of an actual number of times that catalyst temperature has exceeded the catalyst temperature threshold not to be exceeded for a powertrain torque assessment level of two (e.g., the actual number of times that catalyst temperature has entered permissible catalyst temperatures for a powertrain torque assessment level of three). The vertical axis represents the actual number of times that catalyst temperature has exceeded the catalyst temperature threshold not to be exceeded for a powertrain torque assessment level of two. The horizontal axis represents time and time increases from the left side of the figure to the right side of the figure. Trace 710 represents the actual number of times that catalyst temperature has exceeded the catalyst temperature threshold not to be exceeded for a powertrain torque assessment level of two.

At time t0, the powertrain torque request is low and the powertrain torque assessment level is one. Therefore, the catalyst temperature threshold not to be exceeded for a powertrain torque assessment level of one 750 is the governing catalyst threshold. The catalyst temperature is well below threshold 750 so the actual number of times that catalyst temperature has exceeded the catalyst temperature threshold not to be exceeded for a powertrain torque assessment level of one is not incremented. Likewise, the catalyst temperature is well below threshold 752 so the actual number of times that catalyst temperature has exceeded the catalyst temperature threshold not to be exceeded for a powertrain torque assessment level of two is not incremented.

The powertrain torque request is increased at times t1, t2, and t3 without the powertrain torque assessment level increasing. The catalyst temperature is well below threshold 750 so the actual number of times that catalyst temperature has exceeded the catalyst temperature threshold not to be exceeded for a powertrain torque assessment level of one is not incremented. Additionally, the catalyst temperature is well below threshold 752 so the actual number of times that catalyst temperature has exceeded the catalyst temperature threshold not to be exceeded for a powertrain torque assessment level of two is not incremented.

At time t4, the autonomous driver increases the powertrain torque assessment level to two and it also increases the requested powertrain torque output. The catalyst temperature increases as the engine's torque output is increased in response to the increase in the powertrain torque request. However, the catalyst temperature remains below threshold 750 so the actual total number of times that catalyst temperature has exceeded the catalyst temperature threshold not to be exceeded for a powertrain torque assessment level of one is not incremented. Additionally, the catalyst temperature is well below threshold 752 so the actual total number of times that catalyst temperature has exceeded the catalyst temperature threshold not to be exceeded for a powertrain torque assessment level of two is not incremented.

At time t5, the autonomous driver powertrain torque request is at a higher level and the powertrain torque assessment level remains equal to two. However, the catalyst temperature now exceeds threshold level 750 so the actual total number of times that catalyst temperature has exceeded the catalyst temperature threshold not to be exceeded for a powertrain torque assessment level of one is now incremented. The catalyst temperature remains below threshold 752 so the actual total number of times that catalyst temperature has exceeded the catalyst temperature threshold not to be exceeded for a powertrain torque assessment level of two is not incremented. Engine service is not requested because the actual total number of times that catalyst temperature has exceeded the catalyst temperature threshold has not exceeded a predetermined value.

At time t6, the autonomous driver powertrain torque request is increased and the powertrain torque assessment level is increased to a value of three. Therefore, threshold 754 becomes the governing catalyst threshold. The catalyst temperature begins to increase in response to the engine torque increasing (not shown). The catalyst temperature continues to exceed threshold level 750 but the actual total number of times that catalyst temperature has exceeded the catalyst temperature threshold not to be exceeded for a powertrain torque assessment level of one is not incremented because catalyst temperature has not been reduced to less than threshold 750 since time t4. The catalyst temperature remains below threshold 752 so the actual total number of times that catalyst temperature has exceeded the catalyst temperature threshold not to be exceeded for a powertrain torque assessment level of two is not incremented. Engine service is not requested because the actual total number of times that catalyst temperature has exceeded the catalyst temperature threshold 750 has not exceeded a predetermined value.

At time t7, engine service is requested because catalyst temperature exceeds threshold 752. However, engine service is not requested due to the actual total number of times that catalyst temperature has exceeded the catalyst temperature threshold 750 has not exceeded a predetermined value. The powertrain torque request levels off at a higher level and the powertrain torque assessment level remains at a value of three.

Thus, vehicle service may be requested in response to a powertrain control parameter exceeding a threshold level that is based on a powertrain torque assessment level of two. Further, vehicle service may be requested in response to a powertrain control parameter exceeding a threshold level that is based on a powertrain torque assessment level of one a predetermined number of times during a vehicle life cycle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations, and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
generating a powertrain torque or power request and a powertrain torque or power urgency assessment level via an autonomous driver for a vehicle, wherein the powertrain torque or power urgency assessment level generated to govern one or more control parameters for powertrain operation of a vehicle is a level two powertrain torque or power urgency assessment level;
adjusting one or more thresholds based on the level two powertrain torque or power urgency assessment level, the one or more thresholds associated with powertrain degradation levels, wherein the one or more thresholds based on the level two powertrain torque or power urgency assessment level are associated with increased powertrain degradation compared to one or more thresholds for a level one powertrain torque or power urgency assessment level;
adjusting powertrain output torque or power based on the one or more thresholds for the level two powertrain torque or power urgency assessment level in response to the powertrain torque or power request;
monitoring one or more control parameters of powertrain components relative to the one or more thresholds;
tracking an actual total number of times the one or more control parameters exceeds the one or more thresholds for the level one powertrain torque or power urgency assessment level; and
returning the vehicle to a service center via the autonomous driver responsive to the actual total number of times a catalyst temperature exceeds an associated catalyst temperature threshold for the level one powertrain torque or power urgency assessment level being greater than a predetermined number of times, the actual total number of times the catalyst temperature exceeds the associated catalyst temperature threshold for the level one powertrain torque or power urgency assessment level being incremented separately from generating the powertrain torque or power urgency assessment level,
wherein the level one powertrain torque or power urgency assessment level indicates that powertrain devices are to be operated as though expected to operate for their full useful life.

2. The method of claim 1, where the powertrain torque or power urgency assessment level is based on input provided via one or more vehicle occupants.

3. The method of claim 1, where the powertrain torque or power urgency assessment level is based on input provided via one or more vehicle systems.

4. The method of claim 3, where the one or more vehicle systems monitor one or more vital signs of a human.

5. The method of claim 1, where powertrain output is adjusted via a controller that receives the powertrain torque or power request from the autonomous driver.

6. A vehicle operating method, comprising:
generating a powertrain torque or power request and a plurality of powertrain torque or power urgency assessment levels via an autonomous driver, wherein a powertrain torque or power urgency assessment level generated to govern one or more control parameters for powertrain operation of a vehicle is a level two powertrain torque or power urgency assessment level;
adjusting one or more thresholds based on the level two powertrain torque or power urgency assessment level, the one or more thresholds associated with powertrain degradation levels, wherein the one or more thresholds based on the level two powertrain torque or power urgency assessment level are associated with increased powertrain degradation compared to one or more thresholds for a level one powertrain torque or power urgency assessment level;
adjusting powertrain or power output torque in response to the powertrain torque or power request based on the one or more thresholds based for the level two powertrain torque or power urgency assessment level;
monitoring one or more control parameters of powertrain components relative to the one or more thresholds for the level one powertrain torque or power urgency assessment level; and
counting an actual total number of times a catalyst temperature exceeds an associated catalyst temperature threshold for the level one powertrain torque or power urgency assessment level during a drive cycle and returning a vehicle to a service center via the autonomous driver responsive to the catalyst temperature exceeding the associated catalyst temperature threshold a predetermined number of times after completing a drive cycle in which the associated catalyst temperature threshold for the level one powertrain torque or power urgency assessment level is exceeded the predetermined number of times, the actual total number of times the catalyst temperature exceeds the associated catalyst temperature threshold for the level one powertrain torque or power urgency assessment level being incremented separately from generating the powertrain torque or power urgency assessment level, wherein the level one powertrain torque or power urgency assessment level indicates that powertrain devices are to be operated as though expected to operate for their full useful life.

7. The method of claim 6, further comprising returning the vehicle to the service center via the autonomous driver responsive to the one or more control parameters exceeding a second threshold level a single time after completing the drive cycle in which the second threshold level is exceeded.

8. The method of claim 7, further comprising requesting vehicle service via a powertrain controller.

9. The method of claim 7, further comprising communicating the powertrain torque or power request and the plurality of powertrain torque or power urgency assessment levels from the autonomous driver to a vehicle controller.

10. The method of claim 7, where the one or more control parameters includes a temperature of an electric energy storage device.

11. The method of claim 6, where adjusting powertrain output torque or power includes adjusting an output torque of an engine.

12. The method of claim 6, where adjusting powertrain output torque or power includes adjusting an output torque of an electric machine.

13. A vehicle system, comprising:
- a propulsion source;
- an autonomous driver; and
- a controller including executable instructions stored in non-transitory memory to:
  - receive a powertrain torque or power request and a powertrain torque or power urgency assessment level via the autonomous driver, wherein the powertrain torque or power urgency assessment level is a level two powertrain torque or power urgency assessment level to govern one or more control parameters for powertrain operation of a vehicle;
  - adjust one or more thresholds based on the level two powertrain torque or power urgency assessment level, the one or more thresholds associated with powertrain degradation level, wherein the one or more thresholds based on the level two powertrain torque or power urgency assessment level are associated with increased powertrain degradation compared to one or more thresholds for a level one powertrain torque or power urgency assessment level;
  - adjust output torque or power of the propulsion source in response to the powertrain torque or power request based on the one or more thresholds based for the level two powertrain torque or power urgency assessment level;
  - monitoring one or more control parameters of powertrain components relative to the one or more thresholds for the level one powertrain torque or power urgency assessment level;
  - counting an actual total number of times a catalyst temperature exceeds an associated catalyst temperature threshold for the level one powertrain torque or power urgency assessment level during a drive cycle, the actual total number of times the catalyst temperature exceeds the associated catalyst temperature threshold for the level one powertrain torque or power urgency assessment level being incremented separately from receiving the powertrain torque or power urgency assessment level, wherein the level one powertrain torque or power urgency assessment level indicates that powertrain devices are to be operated as though expected to operate for their full useful life; and
  - request vehicle service responsive to the actual total number of times the catalyst temperature exceeds the associated catalyst temperature threshold for the level one powertrain torque or power urgency assessment level being greater than a predetermined threshold.

14. The vehicle system of claim 13, where the powertrain torque or power urgency assessment level is based on vehicle operating conditions.

15. The vehicle system of claim 13, where the powertrain torque or power urgency assessment level is based on vital signs of one or more vehicle occupants.

16. The vehicle system of claim 13, where the powertrain torque or power urgency assessment level is based in input from one or more vehicle occupants.

17. The vehicle system of claim 13, where the one or more control parameters includes a turbocharger speed.

* * * * *